United States Patent [19]

Bokariza et al.

[11] Patent Number: 5,221,174

[45] Date of Patent: Jun. 22, 1993

[54] FIELD SHUTTLE WITH END MOUNTED LIFT

[75] Inventors: Paul M. Bokariza, Watsonville; Michael Raine, King City; Gregory L. Branch, Capitola, all of Calif.

[73] Assignee: Valley Fabrication, Inc., Salinas, Calif.

[21] Appl. No.: 781,065

[22] Filed: Oct. 18, 1991

[51] Int. Cl.[5] ............................................. B60P 1/36
[52] U.S. Cl. ............................ 414/401; 414/343; 414/528; 414/635
[58] Field of Search ........................... 414/630-638, 414/401, 343, 345-347, 514, 528, 540, 495, 497, 541; 187/9 R

[56] References Cited

U.S. PATENT DOCUMENTS

| | | | |
|---|---|---|---|
| 2,116,763 | 8/1938 | Fitch | 414/343 |
| 2,635,771 | 4/1953 | Black | 414/540 |
| 2,929,524 | 3/1960 | Carlson et al. | 414/631 X |
| 3,233,758 | 2/1966 | Darfus | 414/540 |
| 3,266,645 | 8/1966 | McWilliams | 414/347 |
| 3,610,453 | 10/1971 | Goodacre | 414/631 |
| 3,720,337 | 3/1973 | Franklin | 414/635 |
| 3,799,372 | 3/1974 | Shaffer | 414/541 |
| 3,841,503 | 10/1974 | Hollenback | 414/541 |
| 3,842,996 | 10/1974 | Shaffer | 414/541 |
| 4,208,160 | 6/1980 | Lövgren | 414/401 X |
| 4,579,501 | 4/1986 | Fox | 414/347 |
| 4,655,667 | 4/1987 | Plumb et al. | 414/343 |
| 4,690,610 | 9/1987 | Fotheringham | 414/631 |
| 4,828,040 | 5/1989 | Schumacher | 172/19 |
| 4,948,326 | 8/1990 | Bedard | 414/635 X |
| 4,968,209 | 11/1990 | Noble | 414/347 X |
| 5,082,090 | 1/1992 | Walker | 414/631 X |
| 5,123,747 | 6/1992 | Derksen | 414/401 X |

FOREIGN PATENT DOCUMENTS

| | | | |
|---|---|---|---|
| 1376851 | 9/1964 | France | 414/634 |
| 839168 | 6/1960 | United Kingdom | 414/632 |

Primary Examiner—David A. Bucci
Attorney, Agent, or Firm—Schneck & McHugh

[57] ABSTRACT

A shuttle vehicle for transferring objects to and from another vehicle, especially a field harvester. The shuttle has a tower lift for raising a platform carrying objects such as pallets of folded containers to a high elevation forming a tunnel-like opening. The shuttle is equipped with horns and locking hooks to engage a field harvester so that the bed of the harvester is brought into alignment with the bed of the shuttle. Boxes from the shuttle are then pushed through the tunnel-like opening of the tower lift onto the flat bed of the shuttle. Once the harvester is unloaded, the support platform of the tower lift may be lowered and objects carried by the lift placed onto the harvester. In this manner, there is a two-way transfer of goods from one vehicle to the other.

13 Claims, 5 Drawing Sheets

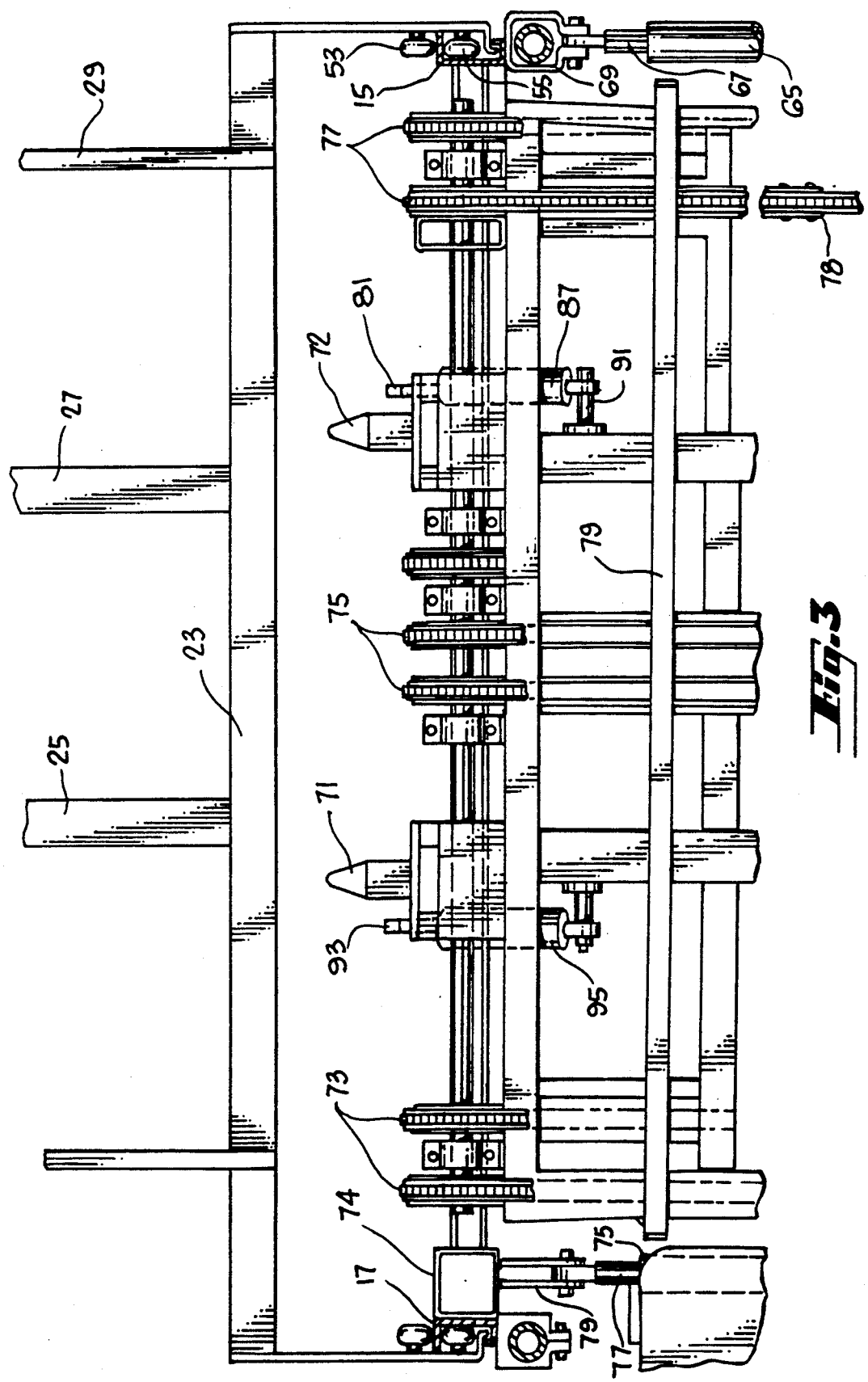

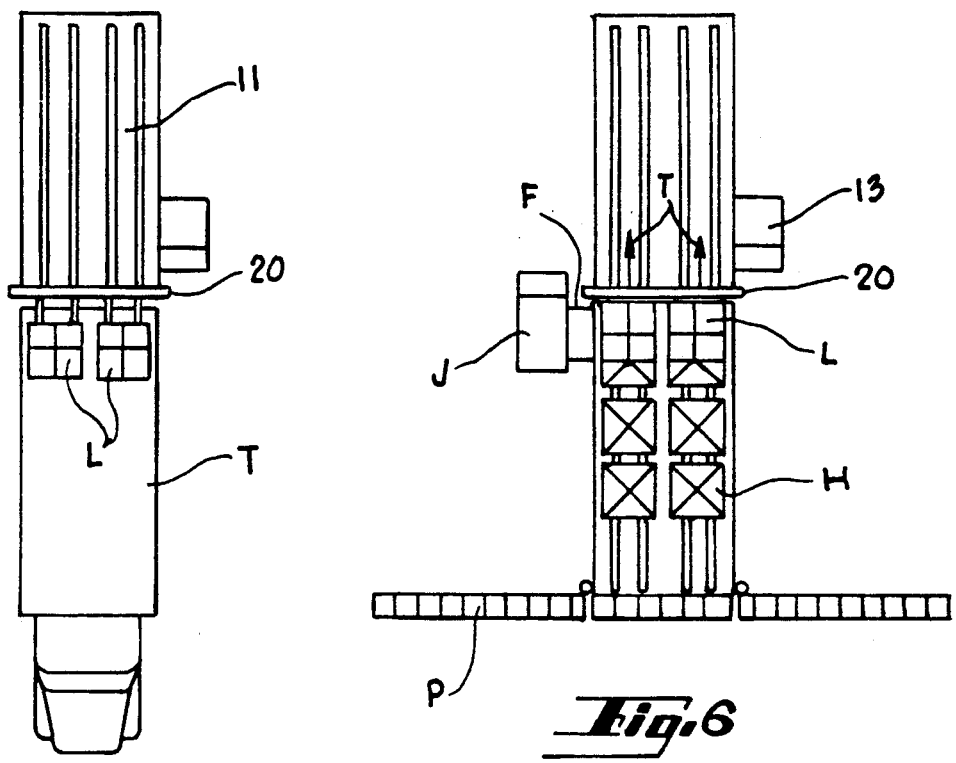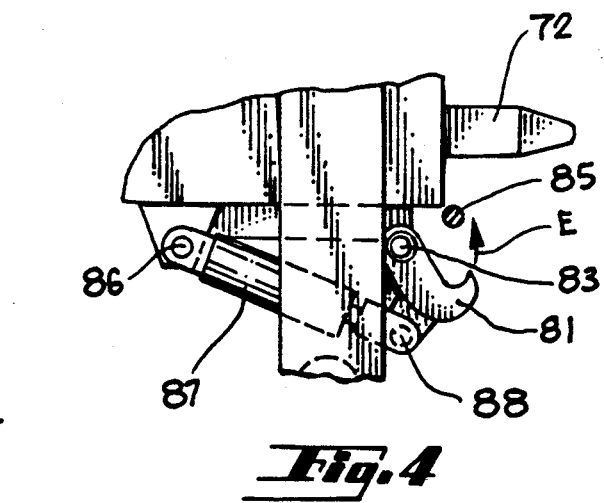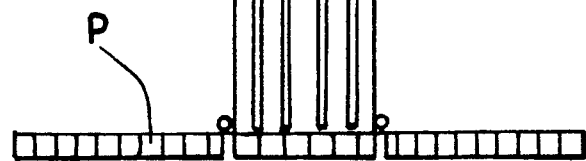

FIELD SHUTTLE WITH END MOUNTED LIFT

DESCRIPTION

Technical Field

This invention relates to land vehicles and, in particular, to a shuttle which loads, unloads and carries boxes for a field harvester to and from a standard flat bed transport vehicle.

Background Art

Shuttles for carrying boxes unloaded from a field harvester to a road transport vehicle are known. A shuttle is a flat bed vehicle whose bed height and width are generally the same as the bed of a field harvester. When the field harvester and shuttle are brought into an abutting relationship, conveyors on the harvester and shuttle are able to move boxes onto the shuttle so that the harvester can be unloaded. The harvester is aligned with the shuttle by means of a pair of spaced apart horns, projecting from one vehicle and fitting into horn-receiving members of the other vehicle. Registration of the horns with the horn-receiving members provides both lateral and vertical alignment of the beds of the harvester and shuttle. Boxes on one vehicle can be carried by a conveyor to the conveyor equipped bed of the other vehicle.

One of the problems which arises is that in receiving field boxes from a field harvester, there is no method to deposit new empty containers which have been transported out to the field harvester. The new containers are used to form field boxes for the next load. Considerable time and expense is incurred if an extra forklift must be employed to transfer empty containers from one vehicle to the other.

Another problem which arises is that in transferring field boxes to a transport vehicle there is no means for transferring new field boxes from the transport vehicle to the shuttle.

Lastly, there is no method of transferring field boxes to a standard transport vehicle; present transport vehicles all require a built in conveyor in order to help transfer the load.

An object of the invention was to devise an improved shuttle which allowed off-loading of field boxes from a field harvester and at the same time included means for off-loading from the shuttle, empty containers to be made into new field boxes.

Another object of the invention was to enable loading new empty containers from the road transport vehicle to the shuttle at the same time full field containers are loaded from the shuttle to the road transport vehicle. Still another object of the invention was to enable loading a standard transport vehicle with full field boxes from the shuttle.

SUMMARY OF INVENTION

The above object is achieved in a shuttle of the type having a flat horizontal bed with front and rear ends, at least one end having a width which is sufficient for loading or unloading of loaded field boxes. The shuttle features a tower forklift which may be raised to a position allowing loading and unloading of field boxes beneath the forklift platform. The forklift platform itself acts as a storage area for empty containers which will be formed into new field boxes after a harvester is unloaded. In this manner, empty containers may be brought to the harvester and kept on the lift of the shuttle, being unloaded from the shuttle onto the harvester only after the harvester load has been transferred to the shuttle. Similarly, empty containers may be taken from the road transport vehicle and stored on the shuttle lift before unloading full cartons to the transport vehicle.

BRIEF DESCRIPTION OF THE DRAWINGS

FIG. 3 is a top view of a forward end of a shuttle.

FIG. 4 is a top detail plan of a hook for locking a shuttle to a harvester.

FIGS. 5-8 are a top plan view showing shuttle pickup of empty containers, loading of field boxes onto the shuttle from a harvester, then loading of empty containers onto the harvester, and finally loading field boxes to the transport vehicle.

BEST MODE FOR CARRYING OUT THE INVENTION

Figure 1:
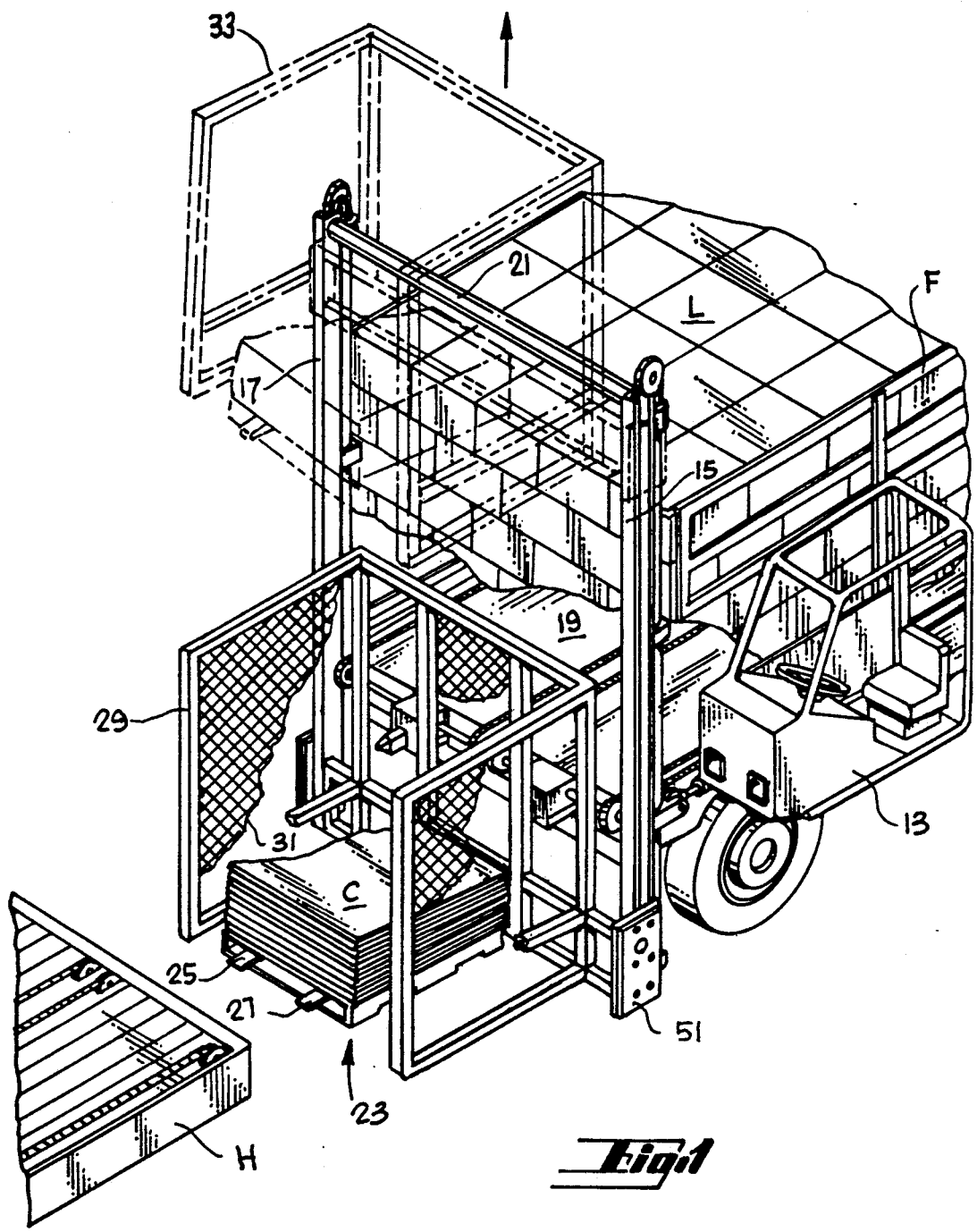
FIG. 1 is a perspective view of a portion of a shuttle in accord with the present invention.

With reference to FIG. 1, a first end of a shuttle is shown. The shuttle includes a cab 13, first and second masts 15 and 17 which are spaced apart on either side of shuttle bed 19. The first and second masts are held together by cross-strut 21 and further strength is added by one or more upright beams which may be fastened to each mast. Each mast is connected to a hydraulic cylinder, rod and sprocket which serves to lift, by means of chain 46, platform 23 which may comprise a pair of forks 25, 27 for supporting a load, and comprise upright portion 51. The platform 23 may be enclosed within a three-sided cage 29, having metal webbing 31 for safety, to keep any of the lifted load from falling onto anyone below.

Dashed lines 33 show the cage 29 in a raised position, above a load L of full field boxes which has been pushed onto the shuttle below the elevated lift. Only when loads are being transferred from a harvester, such as the harvester H, is the platform raised to the position indicated by the dashed lines 33. Once transfer is accomplished, the platform is lowered.

Figure 2:
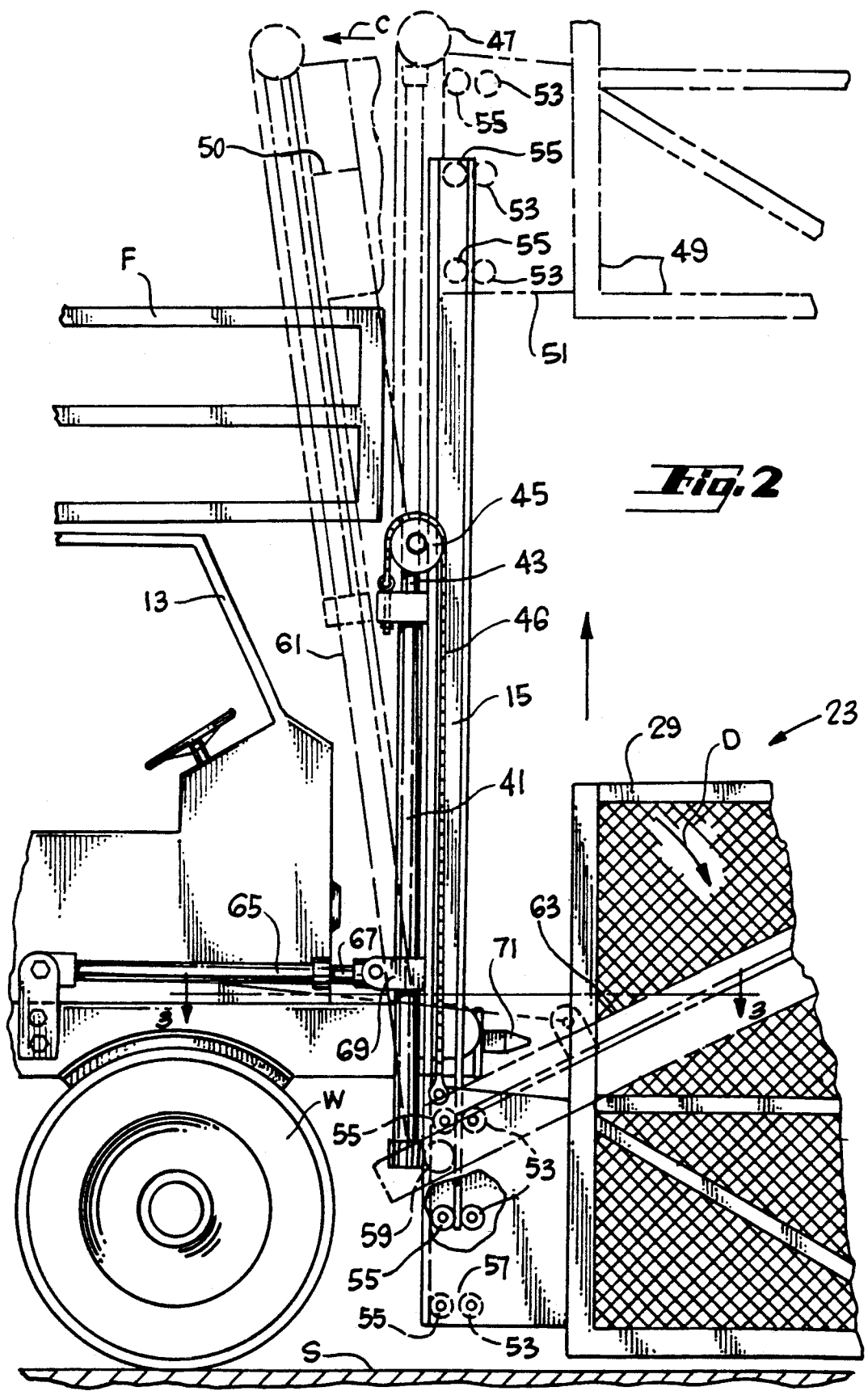
FIG. 2 is a side elevation of a portion of the shuttle illustrated in FIG. 1.

FIG. 2 shows the platform 23 and cage 29 in the lowered position and then again in the raised position 49. Also the platform and cage may be raised and tilted rearward in the direction of arrow "C" to position 50. The cage is especially effective at retaining the load when the mast is tilted rearward to the position 50. Forward or rearward tilting may be useful in unloading platform 23 by aligning forks 25 and 27 in FIG. 1 with the other vehicle.

In FIG. 2 the structure of the platform's support structure may be more clearly seen. The upright mast 15 has a connected cylinder 41 which in turn carries an internal piston 43, which, in turn, supports a sprocket 45. A chain 46 connected to the cylinder 41 travels over the sprocket 45 and connects to upright portion 57 of the platform 23. For each inch the piston 43 extends upwardly, the platform is lifted two inches by the chain 46, as is common on many fork lifts. The top of the sprocket travel indicated by the dashed lines 47. In this position, the platform 23 will be raised to the position indicated by the dashed lines 49. The platform 23 includes an upright portion 51 which includes wheels 53.

The upright mast has a rail cross section so that one set of wheels 53 on the upright portion of the platform can oppose another set of wheels 55 with a portion of the mast separating the two. The two sets of wheels 53 and 55 roll on opposite wall surfaces of a portion of the mast. When the platform is fully extended upwardly the lower two spaced apart sets of wheels remain in contact with the mast. Similarly, when the platform is lowered, the upper two sets of wheels remain in contact with the mast even though one set of wheels, for example, the set 57 may be so low that the set is no longer in contact with the mast. Thus, platform 23 may pick a load off support surfaces, while mast 15 clears surface S on which the shuttle travels by means of wheel W.

This arrangement allows for a shorter mast, as required for overhead power wire clearance, yet gives the required vertical travel for clearing the transferred field cartons without adding a second stage or section to the mast.

A pivot bearing 59 connects mast 15 to a bracket associated with the undercarriage of the shuttle. Pivot bearing 59 allows mast 15 to tilt rearwardly as indicated by dashed line 61 in the direction of arrow C or, alternatively, to tilt forwardly in the direction indicated by arrow D to position indicated by the dashed line 63. Motion is controlled by a hydraulic cylinder 65 carrying a piston 67. The piston is connected to a support 69 which is affixed to mast 15 adjusting the angle of mast 15, relative to vertical. A fence F is connected to a side of the shuttle between the bed and cab 13. As seen in FIG. 1, the fence F serves to keep the boxes comprising load L in place.

Figure 9:
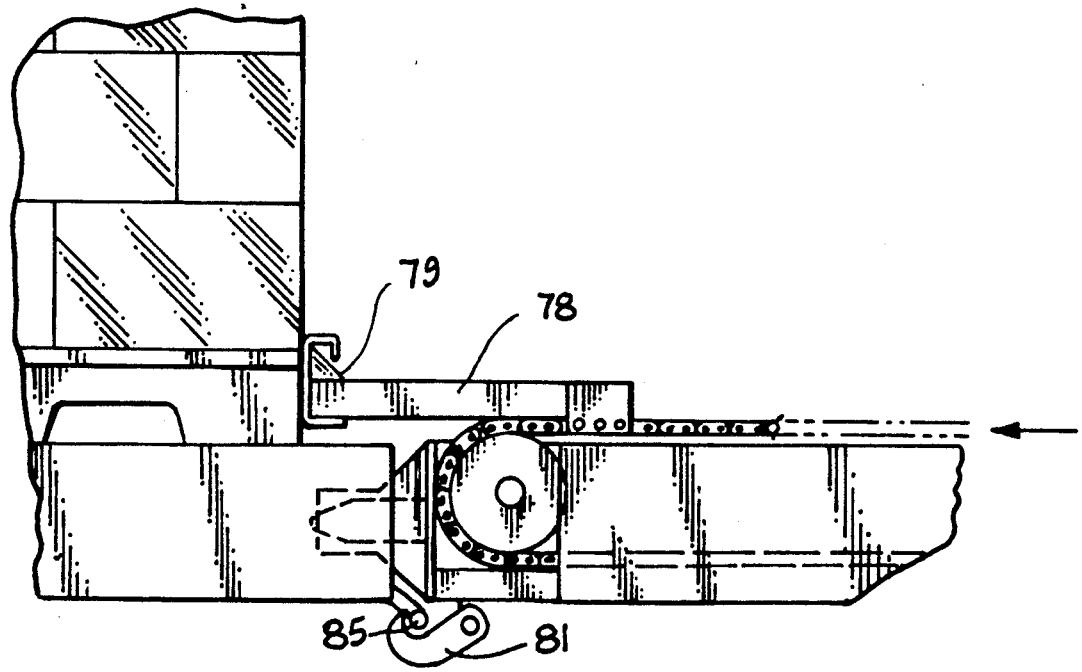
FIG. 9 is a side elevation of push bar and conveyor.

Returning to FIG. 2, in order to achieve registration with the position of a field harvester, the shuttle carries a horn 71 which fits into a horn receiver which is part of the shuttle. The horn structure may be seen more clearly in FIG. 3. Horn 71 projects forwardly toward platform 23 and the forks 25, 27. The shuttle bed may be seen to have pairs of chain conveyors 73, 75, 77. Also seen are the push bar 79 and its offset attachment 78 which attaches the push bar to all the chains. This offset attachment is shown more clearly in the side elevation FIG. 9. In addition to receiving loads from the harvester, these conveyors are designed to push loads from the shuttle to the road transport vehicle which lacks its own conveyor. The reason for the offset attachment is obvious in FIG. 9; with it, the field boxes would not be pushed entirely onto the transport vehicle before the bar started rotating around the sprocket. Returning to FIG. 3, the mast 15 may be seen to be an L-shaped bracket with wheels 53 and 55 passing on either side of the wall of the bracket 15. On the opposite side of the shuttle, the mast 17 has a similar cross-section and is stiffened with a beam 74 having a rectangular cross-section. While the right side of the shuttle has a piston 67 connected to mast 15 through support 69, on the opposite side, a corresponding piston 75 having a cylinder 77 is connected to beam 74 through a support 79. A beam is provided on only one side of the shuttle bed in order to allow more clearance for Cab J as shown in FIG. 6 at point "F".

FIG. 4 shows a hook 81 pivoting about a rod 83 below horn 72. Hook 81 engages a bar 85 carried by a harvester. A hydraulic cylinder 87 has one end 86 fixed to a shuttle bed and an opposite end 88 connected to hook 81 for actuating locking motion relative to bar 85, indicated by the arrow E. Returning to FIG. 3, the cylinder 87 may be seen mounted from a standoff 91 for controlling hook 81, just to the right of horn 72. A similar hook 93 is mounted below and to the left of horn 71 and is controlled by the hydraulic cylinder 95. Hooks 81 and 93 operate together to lock the shuttle in registration with another vehicle during load transfer.

Operation of the shuttle is illustrated in FIGS. 5-7. In FIG. 5, the shuttle 11 is seen having the tower lift 20 picking up two pallets of empty, folded lightweight containers L from a highway traveling truck T. Once the pallets are picked up by the shuttle, the shuttle travels to a harvester shown in FIG. 6. The harvester has a processing line P wherein agricultural products are processed and put into heavy field boxes H. The light containers and pallets are lifted in the tower lift 20 with the heavy boxes passing underneath in the direction indicated by the arrows T. Harvester operation is controlled from a cab J, while shuttle operation is controlled from cab 13.

Figure 8:
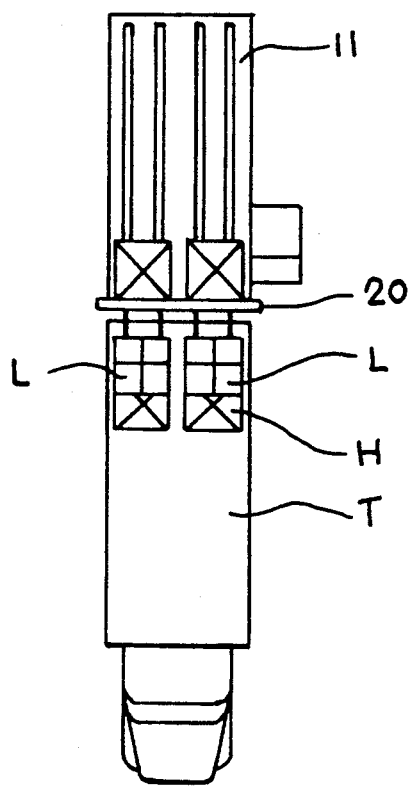

In FIG. 7, the field boxes H have been transferred to the bed of the shuttle while the light folded containers L have been placed on the bed of the harvester so that empty containers may be assembled into field boxes for use by the processing line P. Once the shuttle is loaded, it may be driven to the transport vehicle. The shuttle is shown transferring its field containers to the transport vehicle under the empty new containers which have been lifted by the shuttle load platform. FIG. 8 is the same as FIG. 5 except that the shuttle not only receives new containers, it also has its load of full field containers to offload. Since the shuttle has the push bar 79, it is not required that the transport vehicle have a conveyor. Without the push bar 79 the load would only offload part way until the friction of the load against the transport vehicle bed would overcome the friction of the conveyor chains against the bottom of the load. Without the hook 81 and bar 85 locking the shuttle to the transport vehicle, shown in FIG. 9, the friction of the load against the transpot vehicle bed would push the transport vehicle away from the shuttle rather than the load onto the shuttle. The shuttle need not be self-propelled. It may be pulled by a tractor, although a self-propelled vehicle is preferred.

We claim:
1. A shuttle for a field harvester comprising,
a vehicle having wheels in contact with a support surface, the wheels supporting a flat horizontally disposed bed with front and rear ends longitudinally separated along an axis of motion of said vehicle, one or both of said ends being a load transfer end having a width sufficient for loading containers thereon,
a tower, disposed at said load transfer end, formed by elongated, parallel, upright first and second masts spaced apart by a distance approximating the width of said load transfer end, said masts each having a lower end spaced clear of the surface on which said wheeled vehicle is in contact and an upper structurally free end with only each of said lower ends being fixed in position relative to said bed, and
a lift, movably mounted relative to the tower, having a load platform extending away from the bed along the axis of motion of said vehicle and having a pair of spaced apart upright portions supporting the platform, the uprights movable in elevation relative to the masts which support them, said masts having a maximum height above the bed sufficient for containers to pass thereunder when said platform is raised to a position near said upper first ends of said elongated masts.

2. The apparatus of claim 1 having means for latching said load transfer end of the bed to another vehicle.

3. The apparatus of claim 2 wherein said means for latching comprises a hook and bar mounted on the other vehicle, said hook operated by a hydraulic cylinder.

4. The apparatus of claim 1 wherein a three sided cage is disposed about said load platform.

5. The apparatus of claim 1 wherein opposed sides define said width of the load transfer end, one side having an operator cab connected thereto.

6. The apparatus of claim 1 wherein said vehicle is a self propelled vehicle.

7. The apparatus of claim 1 wherein said vehicle is a towed vehicle.

8. The apparatus of claim 1 wherein said load platform comprises L-shaped forks.

9. The apparatus of claim 1 having means built into said bed for passing containers beneath said raised platform.

10. The apparatus of claim 9 wherein said means for passing containers comprises a chain conveyor.

11. A shuttle for a field harvester comprising,
 a vehicle having wheels in contact with a support surface, the wheels supporting a flat horizontally disposed bed with front and rear ends longitudinally separated along an axis of motion of said vehicle, one or both of said ends being a load transfer end having a width sufficient for loading containers thereon,
 a tower, disposed at said load transfer end, formed by elongated, parallel, upright first and second masts spaced apart by a distance approximating the width of said load transfer end, said masts each having a lower end spaced clear of the surface on which said wheeled vehicle is in contact and an upper free end, each of said lower ends being fixed in position relative to said bed,
 means for tilting said masts relative to said bed, and
 a lift, movably mounted relative to the tower, having a load platform extending away from the bed along the axis of motion of said vehicle and having a pair of spaced apart upright portions supporting the platform, the uprights movable in elevation relative to the masts which support them, said masts having a maximum height above the bed sufficient for containers to pass thereunder when said platform is raised to a position near said upper free ends of said elongated masts.

12. A shuttle for a field harvester comprising,
 a vehicle having wheels in contact with a support surface, the wheels supporting a flat horizontally disposed bed with front and rear ends longitudinally separated along an axis of motion of said vehicle, one or both of said ends being a load transfer end having a width sufficient for loading containers thereon,
 a tower, disposed at said load transfer end, formed by elongated, parallel, upright first and second masts spaced apart by a distance approximating the width of said load transfer end, said masts each having a lower end spaced clear of the surface on which said wheeled vehicle is in contact and an upper free end, each of said lower ends being fixed in position relative to said bed,
 hydraulic cylinders linking said masts and said load transfer end of the bed, and
 a lift, movably mounted relative to the tower, having a load platform extending away from the bed along the axis of motion of said vehicle and having a pair of spaced apart upright portions supporting the platform, the uprights movable in elevation relative to the masts which support them, said masts having a maximum height above the bed sufficient for containers to pass thereunder when said platform is raised to a position near said upper free ends of said elongated masts.

13. A shuttle for a field harvester comprising,
 a vehicle having wheels in contact with a support surface, the wheels supporting a flat horizontally disposed bed with front and rear ends longitudinally separated along an axis of motion of said vehicle, one or both of said ends being a load transfer end having a width sufficient for loading containers thereon,
 a tower, disposed at said load transfer end, formed by elongated, parallel, upright first and second masts spaced apart by a distance approximating the width of said load transfer end, said masts each having a lower end spaced clear of the surface on which said wheeled vehicle is in contact and an upper free end, each of said lower ends being fixed in position relative to said bed, each of said masts further having an upright hydraulic cylinder carrying an extendible piston with a pulley mounted thereon, and
 a lift, movably mounted relative to the tower, having a load platform extending away from the bed along the axis of motion of said vehicle and having a pair of spaced apart upright portions supporting the platform, the upright portions movable in elevation relative to the masts which support them and said upright portions connected to said upright hydraulic cylinders via said pulleys, said masts having a maximum height above the bed sufficient for containers to pass thereunder when said platform is raised to a position near said upper free ends of said elongated masts.

* * * * *

UNITED STATES PATENT AND TRADEMARK OFFICE
CERTIFICATE OF CORRECTION

PATENT NO. : 5,221,174
DATED : June 22, 1993
INVENTOR(S) : Bokariza et al.

It is certified that error appears in the above-identified patent and that said Letters Patent is hereby corrected as shown below:

Column 2, line 65, before the word "indicated", insert
　　　the word - - is - -.

Claim 1, column 5, line 1, the word "first" should read
　　　- - free - -.

Signed and Sealed this

Eighteenth Day of January, 1994

Attest:

BRUCE LEHMAN

Attesting Officer　　Commissioner of Patents and Trademarks